US010882215B2

(12) United States Patent
Pedicini et al.

(10) Patent No.: US 10,882,215 B2
(45) Date of Patent: Jan. 5, 2021

(54) PROCESSES FOR PRODUCING POLYMER POWDERS

(71) Applicant: Arkema Inc., King of Prussia, PA (US)

(72) Inventors: Angelo Pedicini, Lansdale, PA (US); Bruce Clay, Boyertown, PA (US); Benoit Brule, Beaumont-le-Roger (FR)

(73) Assignee: Arkema Inc., King of Prussia, PA (US)

( * ) Notice: Subject to any disclaimer, the term of this patent is extended or adjusted under 35 U.S.C. 154(b) by 268 days.

(21) Appl. No.: 16/066,320

(22) PCT Filed: Dec. 21, 2016

(86) PCT No.: PCT/US2016/067922
§ 371 (c)(1),
(2) Date: Jun. 27, 2018

(87) PCT Pub. No.: WO2017/116885
PCT Pub. Date: Jul. 6, 2017

(65) Prior Publication Data
US 2020/0164546 A1 May 28, 2020

Related U.S. Application Data

(60) Provisional application No. 62/271,449, filed on Dec. 28, 2015.

(51) Int. Cl.
| B33Y 70/00 | (2020.01) |
| B29B 9/16 | (2006.01) |
| B29B 13/02 | (2006.01) |
| B29B 13/10 | (2006.01) |
| B33Y 10/00 | (2015.01) |
| B29C 64/153 | (2017.01) |
| B29K 71/00 | (2006.01) |

(52) U.S. Cl.
CPC .............. *B29B 9/16* (2013.01); *B29B 13/021* (2013.01); *B29B 13/10* (2013.01); *B33Y 70/00* (2014.12); *B29B 2009/165* (2013.01); *B29C 64/153* (2017.08); *B29K 2071/00* (2013.01); *B33Y 10/00* (2014.12)

(58) Field of Classification Search
CPC ....................................................... B29B 13/10
See application file for complete search history.

(56) References Cited

U.S. PATENT DOCUMENTS

| 3,065,205 A | 11/1962 | Bonner, Jr. |
| 3,441,538 A | 4/1969 | Marks |
| 3,442,857 A | 5/1969 | Thornton |
| 3,516,966 A | 6/1970 | Berr |
| 4,704,448 A | 11/1987 | Brugel |
| 4,816,556 A | 3/1989 | Gay et al. |

(Continued)

FOREIGN PATENT DOCUMENTS

| DE | 10 2008 024 288 A1 | 12/2009 |
| WO | WO 2010/019463 A1 | 2/2010 |
| WO | WO 2014/191675 A1 | 12/2014 |

OTHER PUBLICATIONS

Journal of Materials Processing Technology Physico-Chemical behaviour of Poly (Ether Ketone) (PEK) in High Temperature Laser Sintering (HT-LS) O.R. Ghita; E. James; R. Trimble & K.E. Evans 214 (2014) pp. 969-978.

*Primary Examiner* — Joseph A Miller, Jr.
(74) *Attorney, Agent, or Firm* — Lynn B. Morreale

(57) ABSTRACT

The present disclosure is directed to improved poly(arylene ether ketone) powders for use in laser sintering.

18 Claims, 4 Drawing Sheets

Micrograph of PEKK powder prepared according to the disclosure

Micrograph of PEKK powder prepared according to Example 3

(56) References Cited

U.S. PATENT DOCUMENTS

| | | |
|---|---|---|
| 6,177,518 B1 | 1/2001 | Lahijani |
| 7,847,057 B2 | 12/2010 | Muller et al. |
| 8,299,208 B2 | 10/2012 | Muller et al. |
| 8,313,087 B2 | 11/2012 | Hesse et al. |
| 2005/0207931 A1 | 9/2005 | Hesse et al. |
| 2007/0267766 A1 | 11/2007 | Hesse et al. |
| 2008/0152910 A1 | 6/2008 | Hesse et al. |
| 2008/0258330 A1 | 10/2008 | Muller et al. |
| 2009/0017220 A1 | 1/2009 | Muller et al. |
| 2009/0280263 A1 | 11/2009 | Richter et al. |
| 2009/0312454 A1 | 12/2009 | Leuterer et al. |
| 2012/0114848 A1 | 5/2012 | Muller et al. |
| 2013/0323416 A1 | 12/2013 | Bertelo et al. |
| 2014/0322441 A1 | 10/2014 | Mathieu et al. |
| 2015/0079378 A1 | 3/2015 | Garcia-Leiner et al. |

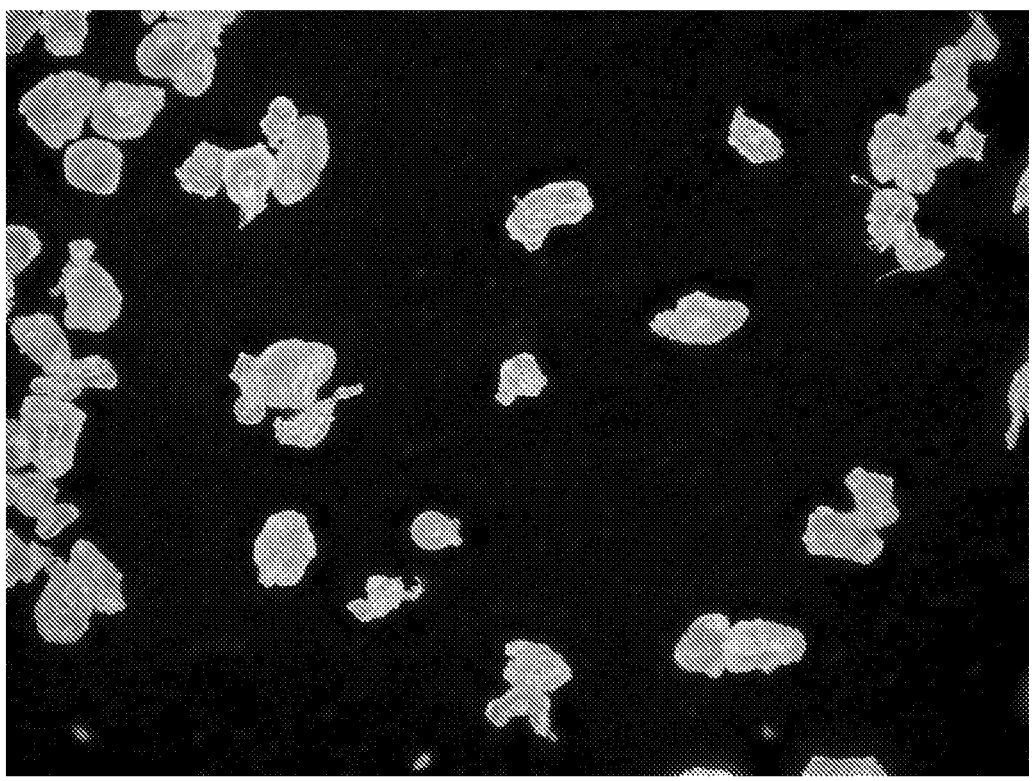
Figure 3A – Micrograph of PEKK powder prepared according to the disclosure

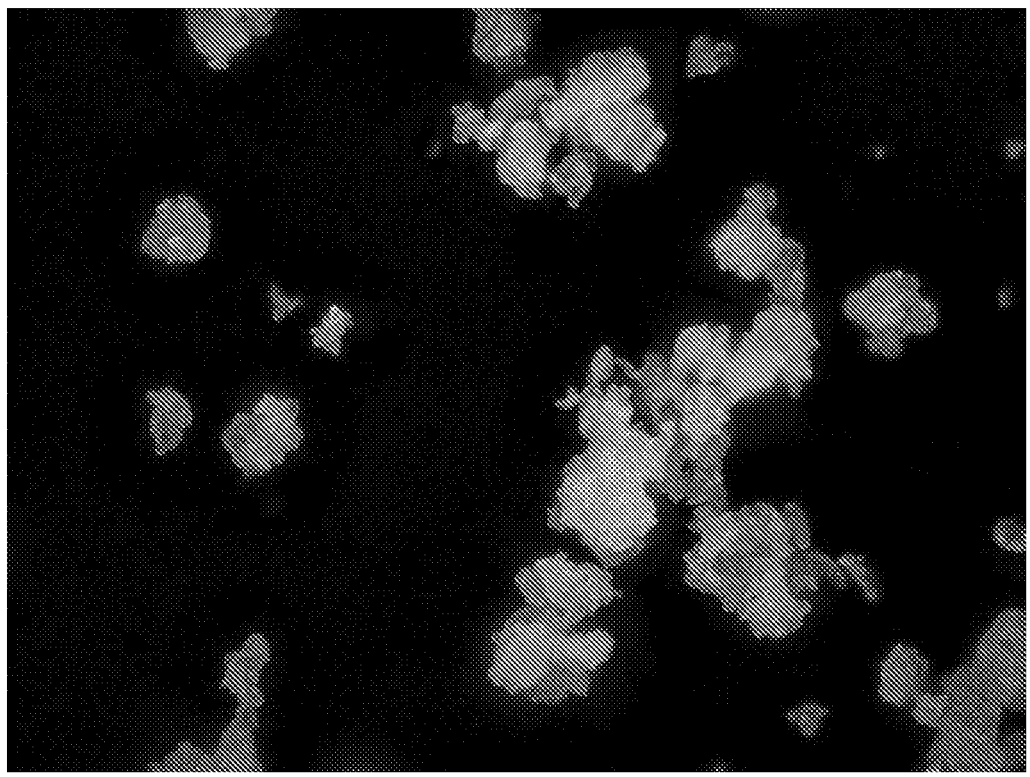
Figure 3B – Micrograph of PEKK powder prepared according to Example 3

PROCESSES FOR PRODUCING POLYMER POWDERS

This application is a national stage application under 35 U.S.C. § 371 of PCT/US2016/067,922 filed Dec. 21, 2016, which claims benefit to U.S. patent application Ser. No. 62/271,449, filed Dec. 28, 2015.

TECHNICAL FIELD

The present disclosure is directed to improved poly (arylene ether ketone) powders for use in laser sintering.

BACKGROUND

Poly(arylene ether ketone) (PAEK) polymers, for example, polyetherketoneketone (PEKK) polymers, are high-performance materials with high thermomechanical properties. These polymers can withstand high temperature, mechanical, and chemical stresses and are useful in the aeronautic, off-shore drilling, automotive, and medical implant fields. Powders of these polymers can be processed by moulding, extrusion, compression, spinning, or laser sintering.

Laser sintering is an additive manufacturing process for forming an object wherein layers of a powder are selectively sintered at positions corresponding to a cross-section of the object using a laser. While PEKK powders have been investigated for preparing objects using laser sintering processes, the resulting objects tend to have a rough appearance and texture. In addition, the resulting objects do not possess the mechanical properties necessary for high performance applications. Methods for forming stronger PEKK-based articles, having a smoother appearance and texture, are needed.

SUMMARY

The present disclosure is directed to methods comprising heating polyetherketoneketone (PEKK) pellets to a temperature of between 160° C. and 300° C., preferably between 180° C. and 290° C., for a time sufficient to produce semicrystalline PEKK pellets having a crystallinity of at least 10%; grinding the semicrystalline PEKK pellets to produce a PEKK powder having a median particle diameter of between about 10 microns and about 150 microns; and heating the PEKK powder to a temperature of about 275° C. to about 290° C., preferably between 280° C. and 290° C., to produce a heat-treated PEKK powder.

BRIEF DESCRIPTION OF THE DRAWINGS

FIG. 3A depicts a micrograph (100× magnification) of heat-treated PEKK powder prepared according to the disclosure.

FIG. 3B depicts a micrograph (200× magnification) of heat-treated PEKK powder prepared according to Example 3.

DETAILED DESCRIPTION OF ILLUSTRATIVE EMBODIMENTS

Figure 1:
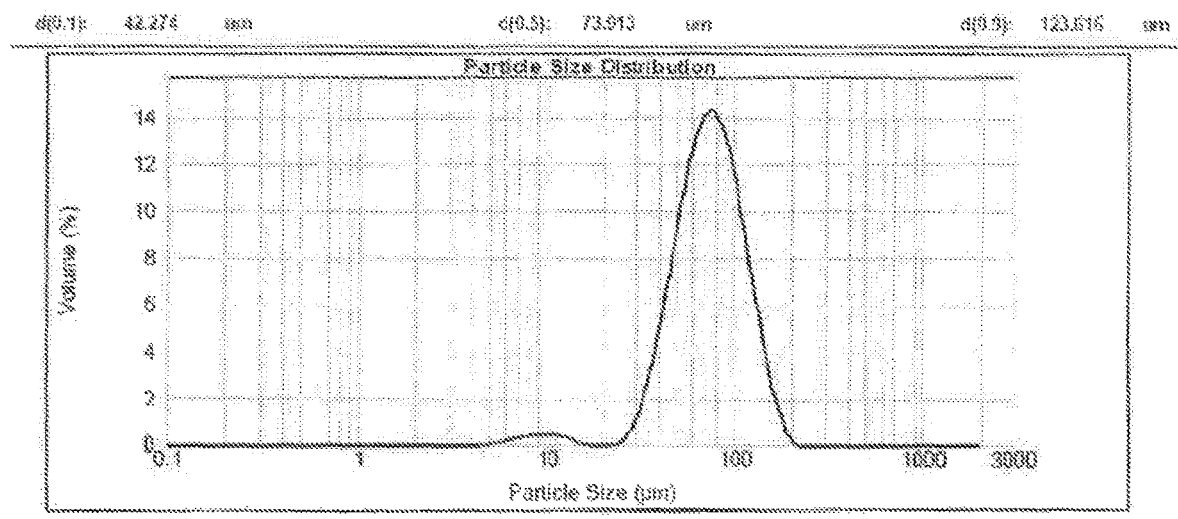
FIG. 1 depicts the particle size distribution of certain powders of the disclosure.

The disclosed compositions and methods may be understood more readily by reference to the following detailed description. It is to be understood that the disclosed compositions and methods are not limited to the specific compositions and methods described and/or shown herein, and that the terminology used herein is for the purpose of describing particular embodiments by way of example only and is not intended to be limiting of the claimed compositions and methods.

Reference to a particular numerical value includes at least that particular value, unless the context clearly dictates otherwise. When a range of values is expressed, another embodiment includes from the one particular value and/or to the other particular value. Further, reference to values stated in ranges include each and every value within that range. All ranges are inclusive and combinable.

When values are expressed as approximations, by use of the antecedent "about," it will be understood that the particular value forms another embodiment.

The term "about" when used in reference to numerical ranges, cutoffs, or specific values is used to indicate that the recited values may vary by up to as much as 10% from the listed value. As many of the numerical values used herein are experimentally determined, it should be understood by those skilled in the art that such determinations can, and often times will, vary among different experiments. The values used herein should not be considered unduly limiting by virtue of this inherent variation. Thus, the term "about" is used to encompass variations of ±10% or less, variations of ±5% or less, variations of ±1% or less, variations of ±0.5% or less, or variations of ±0.1% or less from the specified value.

It is to be appreciated that certain features of the disclosed compositions and methods which are, for clarity, described herein in the context of separate embodiments, may also be provided in combination in a single embodiment. Conversely, various features of the disclosed compositions and methods that are, for brevity, described in the context of a single embodiment, may also be provided separately or in any subcombination. All publications, patent applications, patents and other references mentioned herein are incorporated by reference in their entirety.

The present disclosure is directed to methods of producing PEKK powders that are particularly well-suited for use in additive manufacturing applications. Objects prepared using the described powders have superior physical and mechanical properties as compared to those objects prepared using PEKK powders not produced according to the described processes, for example, as compared to PEKK powders produced according to Example 3.

The described methods use PEKK polymers. The PEKK polymers can be purchased from commercial sources or they can be produced according to any method known in the art, for example, those methods described in U.S. Pat. Nos. 3,065,205; 3,441,538; 3,442,857; 3,516,966; 4,704,448; 4,816,556; and 6,177,518. Suitable polymers for use in the disclosure are supplied by Arkema.

PEKK polymers for use in the present disclosure can include, as repeating units, two different isomeric forms of ketone-ketone. These repeating units can be represented by the following Formulas I and II:

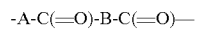

-A-C(=O)-B-C(=O)—    I

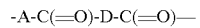

-A-C(=O)-D-C(=O)—    II wherein A is a p,p'-Ph-O-Ph group, Ph is a phenylene radical, B is p-phenylene, and D Is m-phenylene. The Formula I: Formula II isomer ratio, commonly referred to as the T:I ratio in the polymer can be selected so as to vary the total crystallinity of the polymer. The T:I ratio is commonly varied from 50:50 to 90:10, and in some embodiments, 60:40 to 80:20. A higher T:I ratio such as, for example, 80:20, provides a higher degree of crystallinity as compared to a lower T:I ratio, such as, for example 60:40. Preferred T:I ratios include 80:20, 70:30, and 60:40, with 60:40 being particularly preferred. Mixtures of PEKK polymers having different T:I ratios are also within the scope of the disclosure.

The starting PEKK pellets can, where appropriate, comprise one or more additives, such as fillers, in particular inorganic fillers such as carbon black, carbon or non-carbon nanotubes, milled or unmilled fibers, stabilizing agents (light-stabilizing, in particular UV-stabilizing, and heat-stabilizing, including antioxidants), flow-facilitating agents, such as silica, or optical brighteners, dyes or pigments, or a combination of these fillers and/or additives. Preferred examples of additives are milled carbon or glass fibers, inorganic nanoparticles, or organic phosphates, phosphites, diphosphites, and the like, which act as antioxidants and improve the recyclability of the described powders in additive manufacturing. In some embodiments, the PEKK powders can include up to 20 wt. %, preferably up to 10 wt. %, of additives. Melt processing the granular flake to produce pellets allows for the addition of additives that will be incorporated into the final product.

In some embodiments, the PEKK powders are substantially free of additives. For example, in such embodiments, the PEKK powders include 5 wt. % or less, preferably 4 wt. % or less, 3 wt. % or less, 2 wt. % or less, or 1 wt. % of less, of additives.

Preferably, the PEKK polymers for use in the described methods are in the form of pellets, which are sometimes referred to as granulates. Pellets, as defined herein, include extruded forms of PEKK that can be annealed and ground including, for example, fibers, filaments, rods, tubes, pipes, sheets, films, beads, and the like. The starting PEKK pellets can have a median particle diameter, as measured using laser light scattering diffraction methods known in the art, of up to 20 mm, for example, 0.25, 0.5, 1, 2, 3, 4, 5, 6, 7, 8, 9, 10, 11, 12, 13, 14, 15, 16, 17, 18, 19, or about 20 mm. In preferred aspects, the PEKK pellets have a median particle diameter of about 1 mm to about 10 mm. In other aspects, the PEKK pellets have a median particle diameter of about 2 mm to about 5 mm. A preferred laser light scattering diffraction instrument for use in determining median particle diameter is a Malvern Mastersizer 1000.

In some aspects, the starting PEKK pellets are amorphous, that is, the starting PEKK pellets have no measurable amount of crystallinity, as measured by either Differential Scanning Calorimetry (DSC) or X-ray diffraction techniques. In other aspects, the starting PEKK pellets have no more than 5% crystallinity, e.g., less than 5% crystallinity, less than 4% crystallinity, less than 3% crystallinity, less than 2% crystallinity, or less than 1% crystallinity.

According to the disclosure methods, the starting PEKK pellets are heated for a time and at a temperature sufficient to increase the crystallinity of the starting PEKK pellets. In preferred aspects, the starting PEKK pellets are heated to a temperature of between about 160° C. and about 300° C., preferably between 160° C. and 300° C. For example, the starting PEKK pellets can be heated to about 160, 170, 180, 190, 200, 210, 220, 230, 240, 250, 260, 270, 280, 290, or about 300° C. In some aspects, the starting PEKK pellets are heated to a temperature of between 180° C. and 290° C. In other aspects, the starting PEKK pellets are heated to a temperature of between 180° C. and 250° C.

Those skilled in the art will be able to ascertain the length of time the starting PEKK pellets should be heated to increase the crystallinity of the starting PEKK pellets. In some aspects, the starting PEKK pellets are heated for at least 5 minutes. In other aspects, the starting PEKK pellets are heated for between 5 minutes and 60 minutes. In yet other aspects, the starting PEKK pellets are heated for between 5 minutes and 30 minutes.

According to the disclosure, the starting PEKK pellets are heated for a time and at a temperature sufficient to produce semicrystalline PEKK pellets. In some aspects, the semicrystalline PEKK pellets have a crystallinity of at least 10%. In other aspects, the semicrystalline PEKK pellets have a crystallinity of between 10% and 65%. For example, the semicrystalline PEKK pellets have a crystallinity of 10, 15, 20, 25, 30, 35, 40, 45, 50, 55, 60, or 65%.

According to the disclosure, the semicrystalline PEKK pellets are ground to produce a PEKK powder. The grinding can be achieved using any grinding techniques known in the art to be useful for grinding PEKK pellets. For example, the grinding can be performed by hammer mill, attrition mill, or pinned disc mill. The grinding can also be performed by jet milling. Combinations of these grinding methods can also be employed. In some aspects, the grinding is performed under ambient conditions, that is, performed without any added cooling. Because heat is generated in the grinding process, "ambient" may in some contexts mean a temperature greater than about 20-25° C. In other aspects, the grinding is performed with added cooling.

The semicrystalline PEKK pellets are ground to produce PEKK powders having a median particle diameter of between about 10 microns and about 150 microns, as measured on the dry powder using laser light scattering methods known in the art. As used herein, "powder" refers to a material composed of small particles of PEKK. The PEKK powders can have a median particle diameter of about 10, 20, 30, 40, 50, 60, 70, 80, 90, 100, 110, 120, 130, 140, or about 150 microns. In preferred aspects, the PEKK powders have a median particle diameter of about 30 microns to about 100 microns. In other preferred aspects, the PEKK powders have a median particle diameter of about 50 microns.

According to the disclosure, the PEKK powder is heated to produce a heat-treated PEKK powder. In preferred aspects, the PEKK powder is heated to a temperature of about 275° C. to about 290° C., for example 275, 280, 285, or about 290° C. In preferred aspects, the PEKK powder is heated to between 280° C. and 290° C.

The heat-treated PEKK powders prepared according to the disclosure have improved physical and mechanical properties, as compared to PEKK powders produced according to other methods, for example, as compared to PEKK powders produced according to Example 3. For example, the described heat treated PEKK powders have improved bulk density. The heat-treated PEKK powders described herein have a bulk density of between 0.35 g/cm$^3$ and 0.90 g/cm$^3$, for example, 0.35, 0.40, 0.45, 0.50, 0.55, 0.60, 0.65, 0.70, 0.75, 0.80, 0.85, or about 0.90 g/cm$^3$. In preferred aspects, the heat-treated PEKK powders have a bulk density of between 0.40 and 0.50 g/cm$^3$. As used here, "bulk density," also referred to in the art as "apparent density" can be determined using ASTM D1895, the most recent standard in effect at the time of the filing of this disclosure.

The heat treated PEKK powders described herein have desired flow properties, as compared to PEKK powders not produced according to the described methods, for example, as compared to PEKK powders produced according to Example 3. For example, the heat treated PEKK powders of the disclosure have improved pourability, lower basic flow energy, better flow, and/or are more resistant to caking, as compared to control powders, for example, as compared to PEKK powders produced according to Example 3. Various powder flow properties, also referred to as powder rheology, can be analyzed using a rheometer such as the FT4™ Powder Rheometer (Freeman Technology, Medford, N.J.).

The heat treated PEKK powders are particularly well-suited for use in laser sintering applications. Laser sintering applications are useful in additive manufacturing processes. These methods are known in the art. See, e.g., O. G. Ghita et al., J. Materials Processing Tech. 214 (2014) 969-978; U.S. Pat. Nos. 8,299,208; 7,847,057; 8,313,087; U.S. Published Application Nos. 2012/0114848; 2008/258330; 2009/017220; 2009/312454; 2005/0207931; 2007/0267766; 2008/0152910; incorporated herein by reference. Particularly useful heat treated PEKK powders include those having a median particle diameter of between 30 and 100 microns, 40 to 75 microns, or 45 to 55 microns, with about 50 microns being most preferred. These powders will having a bulk density of 0.30 g/cm$^3$ or greater, for example, 0.40 g/cm$^3$ to 0.50 g/cm$^3$, as described herein.

The particles of the heat treated PEKK powders are also more regularly-shaped, as compared to powders produced according to other methods, for example, as compared to PEKK powders produced according to Example 3. For example, heat treated PEKK powders produced according to the described methods have particles that are rounder than the particles of PEKK powders produced using other methods. Particle morphology can be determined using electron microscopy using techniques known in the art. Particle roundness can be determined using particle size analysis and techniques known in the art.

Articles prepared by laser sintering the powders of the disclosure will have improved surface roughness properties. "Surface roughness," can be quantified using Ra (μm), which can be determined using surface roughness testing apparatus known in the art, for example, MITUTOYO SURFTEST SJ-201. Improvements in surface roughness can also be visually ascertained.

The ability to recycle/reuse unsintered powders of the disclosure for subsequent additive builds for high performance materials in additive manufacturing reduces waste while maintaining consistent properties as compared with parts built using 100% virgin powder.

The disclosure is directed to, among other things, the following aspects.

Aspect One. A method comprising
heating PEKK pellets to a temperature of between 160° C. and 300° C., preferably between 180° C. and 290° C., for a time sufficient to produce semicrystalline PEKK pellets having a crystallinity of at least 10%;
grinding the semicrystalline PEKK pellets to produce a PEKK powder having a median particle diameter of between about 10 microns and about 150 microns; and
heating the PEKK powder to a temperature of about 275° C. to about 290° C., preferably between 280° C. and 290° C. to produce a heat-treated PEKK powder.

Aspect Two. The method of aspect 1, wherein the PEKK pellets have a crystallinity of no more than 5%.

Aspect Three. The method of aspect 2, wherein the PEKK pellets are amorphous.

Aspect Four. The method of aspect 1, wherein the T:I Isomer ratio of the PEKK pellets is between 50:50 to 90:10, preferably 60:40 to 80:20, more preferably 60:40.

Aspect Five. The method of aspect 1 or aspect 2, wherein the PEKK pellets are heated to a temperature of about 180° C. to about 250° C.

Aspect Six. The method of any one of the preceding aspects, wherein the PEKK pellets have a median particle diameter of about 1 mm to about 10 mm, preferably 2 mm to 5 mm.

Aspect Seven. The method of any one of the preceding aspects, wherein the PEKK pellets are heated for at least 5 minutes.

Aspect Eight. The method of any one of the preceding aspects, wherein the PEKK pellets are heated for between 5 minute and 30 minutes.

Aspect Nine. The method of any one of the preceding aspects, wherein the amorphous PEKK pellets further comprise one or more additives.

Aspect Ten. The method of aspect 9, wherein the additive is an antioxidant, a flow-facilitating agent, carbon nanotubes, carbon black, or a combination thereof.

Aspect Eleven. The method of aspect 9 or aspect 10, wherein the amorphous PEKK pellets comprise up to 10 wt. % of the one or more additives.

Aspect Twelve. The method of any one of the preceding aspects, wherein the amorphous PEKK pellets are substantially free of additives.

Aspect Thirteen. The method of any one of the preceding aspects, wherein the grinding is performed by hammer mill, attrition mill, pinned disc mill, or jet mill.

Aspect Fourteen. The method of any one of the preceding aspects, wherein the grinding is performed under ambient conditions or cooling conditions.

Aspect Fifteen. The method of any one of the preceding aspects, wherein the PEKK powder has a median particle diameter of about 30 microns to about 100 microns, preferably about 50 microns.

Aspect Sixteen. The method of any one of the preceding aspects, wherein the heat-treated PEKK powder has a bulk density of between 0.35 g/cm$^3$ and 0.90 g/cm$^3$.

Aspect Seventeen. The method of any one of the preceding aspects, wherein the heat-treated PEKK powder has a bulk density of between 0.4 g/cm$^3$ and 0.5 g/cm$^3$.

Aspect Eighteen. A heat-treated PEKK powder having a median particle diameter of between 30 micron and about 100 microns, a bulk density of between 0.40 g/cm$^3$ and 0.50 g/cm$^3$, wherein the particles of the powder are substantially regularly-shaped.

Aspect Nineteen. A method comprising
laser sintering the heat-treated PEKK powder produced according to any one of aspects 1 to 17;
to produce an article.

Aspect Twenty. An article produced according to the method of aspect 19.

Within this specification embodiments have been described in a way which enables a clear and concise specification to be written, but it is Intended and will be appreciated that embodiments may be variously combined or separated without parting from the invention. For example, it will be appreciated that all preferred features described herein are applicable to all aspects of the invention described herein.

The following examples are provided to illustrate compositions, processes, and properties described herein. The examples are merely illustrative and are not Intended to limit the disclosure to the materials, conditions, or process parameters set forth therein.

EXAMPLES

Example 1—General Procedure

PEKK reactor flake is converted into pellets by melt processing the flake in an extruder and chopping the extrudate into pellets with diameters of 2 to 10 mm. The processing temperature of the extrusion was typically 300 to 400° C., preferably 320 to 350° C. The pellets produced were amorphous in microstructure, i.e., 0-5% crystallinity.

The amorphous PEKK pellets were crystallized at a temperature above the glass transition temperature (160° C.) and below the melting temperature (300° C.). Crystallization of the pellets can be performed in a batch-type process with the pellets loaded into a convection oven in metal trays, or batch-type in a vessel with the ability to rotate within an oven in order to keep the pellets in motion during the crystallization. Pellets can also be crystallized in a continuous system in which the pellets are moved on a conveyor belt which passes through a series of heating chambers. The pellets should experience an internal temperature of at least 160° C. for a time greater than 5 minutes.

After the pellets are crystallized, they are ground into a fine powder of average particle size ($D_{50}$) from 35-90 microns by hammer mill, attrition mill, pinned disc mill, jet mill, or any mechanical grinding technique with sufficient energy to reduce the particle size from 3 to 5 mm pellets to fine powder. The grinding process can be carried out under ambient or cryogenic conditions. Without being bound to any particular theory, it is believed that crystallization of the pellets increases the brittleness of the pellets. The ductility and toughness of amorphous pellets prevents them from being ground to the desired average particle size. See FIG. 1.

After the fine powder is produced, it is heat treated at a temperature of between 275 and 290° C.

Example 2

Figure 2:
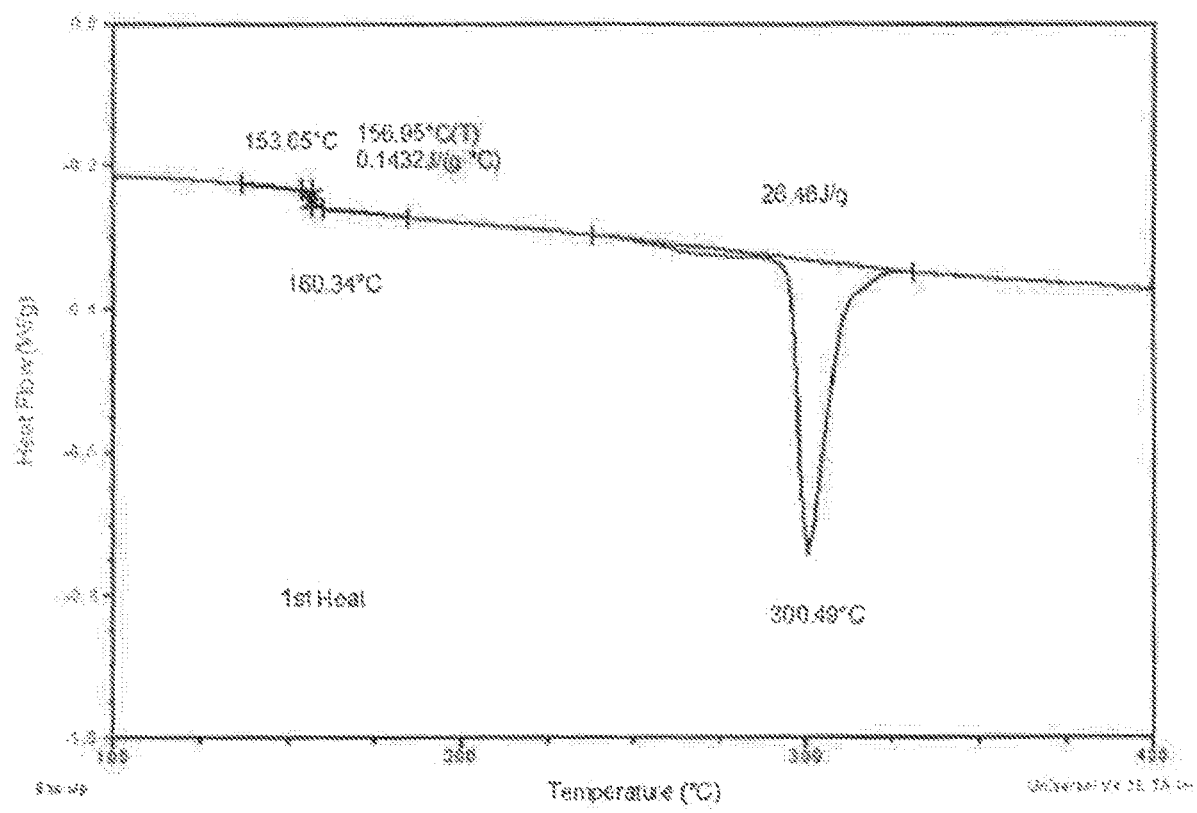
FIG. 2 depicts a DSC of a heat-treated PEKK powder of the disclosure

64/40 PEKK reactor flake was converted to pellets by melt processing. The PEKK pellets were annealed at 280-285° C. The annealed pellets were ground at cryogenic conditions to the desired particle size. The ground powder was heat treated at 285-290° C. A DSC of the treat-treated powder is depicted in FIG. 2. An electron micrograph of a powder prepared according to this Example, taken on a Nikon Eclipse ME600 model optical microscope, is depicted in FIG. 3A (magnification 100×).

The bulk density of a powder made according to this method, as measured on a Freeman Technology FT-4 Powder Rheometer is 0.47-0.52 g/mL.

Example 3—Comparative Example

Comparative PEKK powders can be prepared by grinding semicrystalline PEKK flake to a powder and then heat-treating that powder at a temperature below the melting point of the highest melting crystalline form of the semicrystalline PEKK flake and at or above the melting point of the other crystalline form(s) of the semicrystalline PEKK flake, for a time that increases the content of the highest melting crystalline form relative to the other crystalline form(s) in the PEKK composition. An electron micrograph of a powder produced according to this comparative method, taken on a Nikon Eclipse ME600 model optical microscope, is depicted in FIG. 3B (magnification 200×).

The bulk density of a comparative powder made according to this method, as measured on a Freeman Technology FT-4 Powder Rheometer, is 0.26-0.29 g/mL.

What is claimed:

1. A method comprising
heating polyetherketoneketone (hereinafter "PEKK") pellets to a temperature of between 160° C. and 300° C., for a time sufficient to produce semicrystalline PEKK pellets having a crystallinity of at least 10%;
grinding the semicrystalline PEKK pellets to produce a PEKK powder having a median particle diameter of between about 10 microns and about 150 microns; and
heating the PEKK powder to a temperature of about 275° C. to about 290° C., to produce a heat-treated PEKK powder.

2. The method of claim 1, wherein the PEKK pellets have a crystallinity of no more than 5%.

3. The method of claim 2, wherein the PEKK pellets are amorphous.

4. The method of claim 1, wherein the T:I isomer ratio of the PEKK pellets is between 50:50 to 90:10.

5. The method of claim 1, wherein the PEKK pellets are heated to a temperature of about 180° C. to about 250° C.

6. The method of claim 1, wherein the PEKK pellets have a median particle diameter of about 1 mm to about 10 mm.

7. The method of claim 1, wherein the PEKK pellets are heated for at least 5 minutes.

8. The method of claim 1, wherein the PEKK pellets are heated for between 5 minute and 30 minutes.

9. The method of claim 1, wherein the amorphous PEKK pellets further comprise one or more additives.

10. The method of claim 9, wherein the additive is an antioxidant, carbon nanotubes, carbon black, milled carbon fibers, glass fibers, silica, dyes, pigments, inorganic nanoparticles, organic phosphates, phosphites, diphosphites, or a combination thereof.

11. The method of claim 9, wherein the amorphous PEKK pellets comprise up to 10 wt. % of the one or more additives.

12. The method of claim 1, wherein the amorphous PEKK pellets are substantially free of additives.

13. The method of claim 1, wherein the grinding is performed by hammer mill, attrition mill, pinned disc mill, or jet mill.

14. The method of claim 1, wherein the grinding is performed under ambient conditions or cooling conditions.

15. The method of claim 1, wherein the PEKK powder has a median particle diameter of about 30 microns to about 100 microns.

16. The method of claim 1, wherein the heat-treated PEKK powder has a bulk density of between 0.35 g/cm$^3$ and 0.90 g/cm$^3$.

17. The method of claim 1, wherein the heat-treated PEKK powder has a bulk density of between 0.4 g/cm$^3$ and 0.5 g/cm$^3$.

18. A method comprising
laser sintering the heat-treated PEKK powder produced according to claim 1;
to produce an article.

* * * * *